INVENTORS
RAY I. WILSON,
MALBONE W. GREENE,
JAN W. HAAGEN-SMIT
BY THEIR ATTORNEYS
HARRIS, KIECH, RUSSELL & KERN

April 3, 1962   R. I. WILSON ET AL   3,028,317
GALVANIC CELL

Filed May 28, 1959   2 Sheets-Sheet 2

INVENTORS
RAY I. WILSON,
MALBONE W. GREENE,
JAN W. HAAGEN-SMIT
BY THEIR ATTORNEYS
HARRIS, KIECH, RUSSELL & KERN

3,028,317
GALVANIC CELL
Ray I. Wilson, Covina, Malbone W. Greene, Pasadena, and Jan W. Haagen-Smit, San Gabriel, Calif., assignors to Beckman Instruments, Inc., a corporation of California
Filed May 28, 1959, Ser. No. 816,456
17 Claims. (Cl. 204—1)

This invention relates to gas analysis and to galvanic cells for use in gas analysis in the determination of the quantity of a specific gas present in a gas sample stream.

It is an object of the invention to provide new and improved galvanic cells and methods of gas analysis which are superior to presently known methods and apparatus which operate on the same principle. Conventional methods and apparatus may be used to measure the presence of oxygen, chlorine, bromine, hydrazine, sulfur dioxide, nitrogen dioxide, and other specific gases in a gas mixture in the parts per million range and higher. It is an object of the invention to provide improved methods and apparatus of this general type having a superior long range stability and a much wider operating range.

Conventional methods and apparatus are shown in the United States patents to Haller No. 2,651,612 and Hersch No. 2,805,191, and the copending applications for United States patents of Thayer et al., Serial No. 658,547, filed May 13, 1957, now Patent No. 2,943,036, issued June 28, 1960, and Serial No. 769,969, filed October 14, 1958, now Patent No. 2,943,028, issued June 28, 1960. The electrochemical relations in the present invention are the same as in the above patents and applications and will not be repeated herein in detail. The present invention may be used with any of the electrode and electrolyte combinations disclosed in these patents and applications.

The present invention utilizes the well-known principle of the galvanic cell comprising two electrodes coupled by an electrolyte with the first electrode positioned so that the gas being analyzed may pass thereover. In the absence of the specific gas, the presence of which is to be determined, no reaction occurs in this cell, the first electrode not being reactable with the electrolyte at any time and the second electrode being reactable only when the specific gas is present at the first electrode. However, when the specific gas is present in the gas sample stream, an electrochemical reaction occurs during which the second electrode is partially dissolved and an electrical current is produced in an external circuit connecting the electrodes, the magnitude of the current being a function of the quantity of the specific gas present in the gas sample stream. The previously known methods and apparatus utilizing this principle have not been satisfactory for continuous, long-term use because the instruments have been nonlinear and unstable, requiring repeated calibration and expensive maintenance. Furthermore, the useful range for analysis has been limited because of the nonlinear response.

The terms "cathode" and "anode" are used hereinafter to describe the function of the first and second electrodes, respectively, as used for oxygen analysis. When performing an analysis for certain other gases, such as sulfur dioxide, for example, the first electrode will become the anode which is passed over by the gas and which has the property of not being reactable with the electrolyte at any time.

Applicants have made the unexpected discovery that the linear range may be extended and the stability increased by providing a moving film of electrolyte on the first electrode surface so that the gas sample stream does not directly contact the electrode. This film of electrolyte reduces the sensitivity of the instrument, an expected and undesirable feature. However, a nonobvious improvement in stability and a marked increase in the linear operating range are also achieved. For example, an oxygen analyzer employing the principle of the invention provides essentially linear response from zero to twenty-one percent oxygen in the gas sample and provides reproducible data during continuous operation over a period of a month or more.

It is another object of the invention to provide a galvanic cell having a container with a pool of electrolyte, an anode and a cathode separated by a separator which is porous to the electrolye, with one electrode mounted in the container so that a stream of gas sample may pass through the container over such electrode, means for circulating the electrolyte over the electrode to maintain a film of electrolyte thereon, and a pair of conductors for connecting a current-measuring device to the anode and cathode for measuring the current generated therebetween. A further object is to provide such a structure wherein a moving film of electrolyte is provided on the electrode by lifting a portion of the electrolyte from the pool and directing it downward thereover. Another object is to provide such a structure wherein the moving film of electrolyte is obtained by maintaining a portion of the electrode in the pool and moving the electrode relative to the pool to continuously change the portion thereof which is submerged.

The invention also comprises novel details of construction and novel combinations and arrangement of parts, which will more fully appear in the course of the following description. The drawings merely show and the description merely describes preferred embodiments of the present invention which are given by way of illustration and example.

Figure 1:
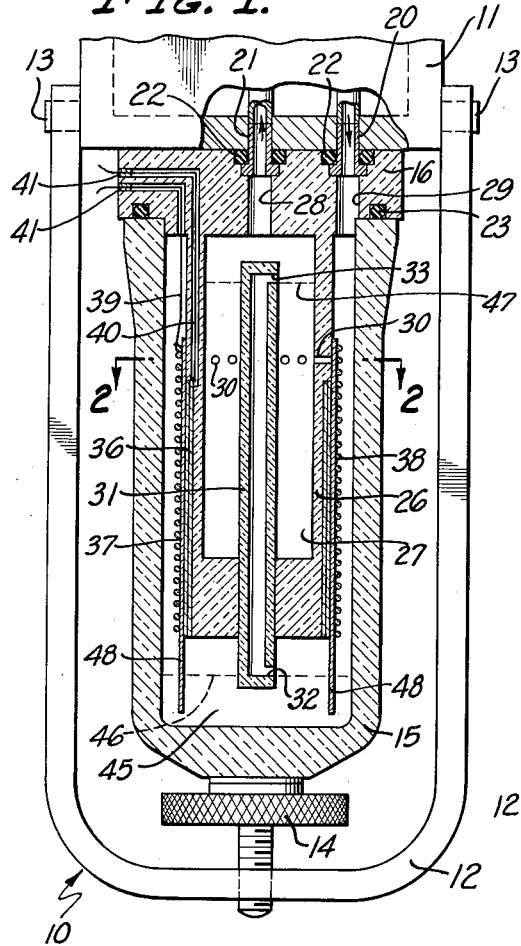
FIG. 1 is a vertical sectional view of the preferred embodiment of the invention.
Figure 3:
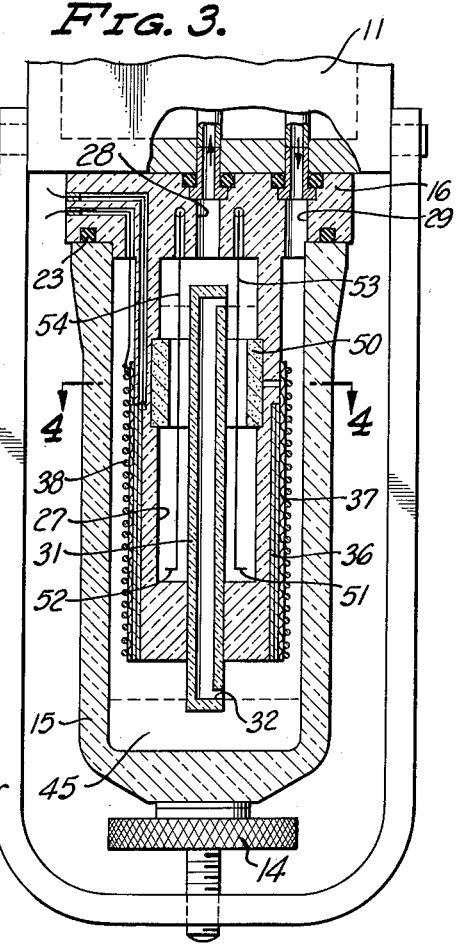
FIG. 3 is a vertical sectional view of an alternative embodiment of the invention.
Figure 6:
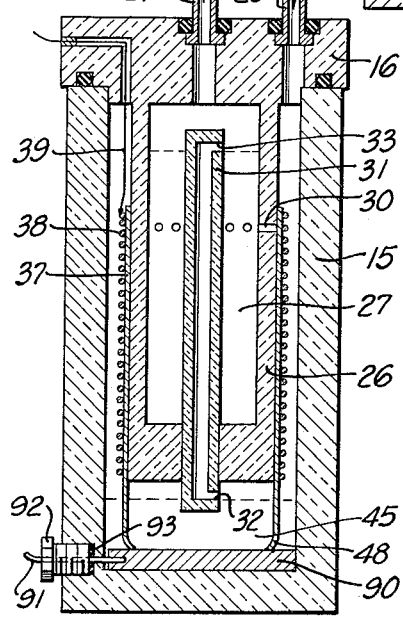
FIG. 6 is a vertical sectional view of another alternative embodiment of the invention.

In the embodiments of FIGS. 1, 3, and 6, the gas sample flow is utilized to provide the moving film of electrolyte on the cathode of the cell, the instrument being used for oxygen analysis. The gas flow lifts the electrolyte from a pool at the bottom of the cell to an upper reservoir from which the electrolyte slowly flows downward over the cathode under gravitational forces.

FIG. 1 illustrates an analysis cell similar to that shown in FIGS. 1–6 of the aforementioned copending application of Thayer et al., Serial No. 658,547. The cell of FIG. 1 of the present invention is adapted to be mounted in the same manner as the cell of the copending application and may be substituted directly therefor if desired.

A galvanic cell 10 is mounted on a reservoir or housing 11 by a U-shaped bail 12. The bail is mounted on pivot posts 13 on the housing 11 and carries a thumb screw 14 for engaging the lower end of a container 15 to clamp the container and a cell form 16 against the bottom surface of the housing. An inlet bushing 20 and an outlet bushing 21 are fitted in the upper end of the cell form 16 for engaging mating openings in the housing, each bushing being provided with an O-ring 22 for sealing engagement with the housing. Another O-ring 23 provides for sealing engagement between the container 15 and the cell form 16.

The cell form 16 has a cylindrical lower end 26 with a chamber 27 therein. A passage 28 provides communication between the chamber 27 and the outlet bushing 21 and a passage 29 provides communication between the inlet bushing 20 and the space between the container and the cell form. A plurality of openings 30 is provided in the wall of the chamber 27 permitting fluid flow from the interior of the chamber to the exterior thereof. A riser tube 31 is carried in the cell form 16 and has a lower opening 32 within the bottom of the container 15 and an upper opening 33 within the chamber 27.

The construction of the electrodes themselves is not critical and any of the conventional forms may be used if desired. In the preferred embodiment shown herein, a sheet metal anode 36 is wrapped around the exterior of the cell form on the end 26 below the openings 30. A porous separator 37 is applied over the anode and is held in place by a plurality of turns of wire 38, which wire functions as the cathode. Alternatively, metal gauze or an apertured plate can be used as a cathode, the openings in the cathode providing for electrolyte flow to the porous separator. The separator is made of a porous material such as filter paper or nylon cloth and is porous to the electrolyte, providing an electrical path between the anode and cathode. In a typical cell, the anode would be a thin sheet of lead, the separator conventional filter paper and the cathode silver wire. The anode terminates below the openings 30; however, the porous separator is applied to cover the openings and the cathode is wrapped over the separator above the openings to keep the separator in place. A conductor 39 is connected at one end to the cathode and passes out through the cell form for connection to one terminal of the current-measuring device and a second conductor 40 is connected to the anode and passes through the cell form for connection to the other terminal of the current-measuring device. The conductor openings in the cell form are sealed, as by wax plugs 41.

A pool 45 of electrolyte is provided in the bottom of the container 15 and additional electrolyte is positioned within the chamber 27. The electrolyte flows out of the chamber through the openings 30 and down over the cathode to the pool in the bottom of the container. The incoming gas sample stream flows in through the bushing 20 and the passage 29, passing downward over the cathode in contact with the film of electrolyte covering the cathode. The gas stream passes into the riser through the lower opening 32, out through the upper opening 33 and leaves the cell through the passage 28 and the outlet bushing 21. When the level of the pool 45 of electrolyte in the bottom of the container is above that indicated by the dashed line 46, the gas pressure will increase until electrolyte is forced up through the riser to the chamber 27. The chamber 27 is initially filled to the level indicated by the dashed line 47 while the container is filled to the line 46. Then when the cell is in operation, the gas stream carries small slugs of electrolyte with it continually, holding the two electrolyte levels 46, 47 substantially constant and maintaining a steady flow of electrolyte downward over the cathode providing a uniform film thickness. The separator 37 is selected of a material having a porosity permitting flow of the electrolyte therethrough while being substantially nonporous to the gas. That is, when wet with electrolyte, the porous separator serves as a check valve which permits the electrolyte to flow out but prevents gas from passing therethrough. Various materials are suitable for use as the separator, including ordinary laboratory filter paper, special filter papers made of glass, nylon, quartz, Teflon, and the like, nylon cloth, and polyvinyl chloride film. Of course, the filter material should be inert to the electrolyte. When an absorbent material, such as filter paper, is used as a separator, tabs 48 may be provided on the lower end of the separator for dipping into the pool 45. These tabs increase the electrolyte pumping rate, apparently because of the syphon action of the wet filter paper.

Figure 2:
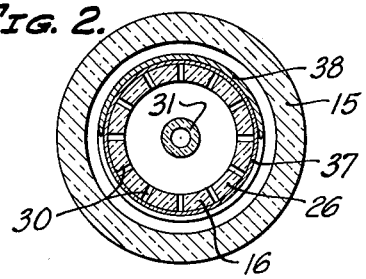
FIG. 2 is a sectional view taken along the line 2—2 of FIG. 1.
Figure 4:
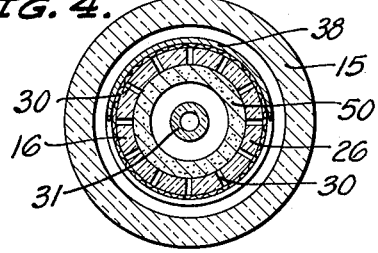
FIG. 4 is a sectional view taken on the line 4—4 of FIG. 3.

An alternative form of the cell of FIGS. 1 and 2 is shown in FIGS. 3 and 4, wherein like elements are identified by the same reference numerals. A sleeve 50 is positioned within the chamber 27 of the cell form overlying the inner ends of the openings 30. The sleeve is made of a porous material such as porous carbon so that electrolyte will flow therethrough to the exterior of the cell form. The rate of flow of electrolyte is controlled by the size and porosity of the sleeve. The separator 37 may be terminated below the openings 30 or may cover the openings as in FIG. 1. A more uniform rate of flow is obtained using the latter construction. The sleeve 50 has a larger working area than the separator 37 which is positioned over the outer ends of the openings 30 in the embodiment of FIG. 1 and therefore is less subject to plugging by precipitated oxides.

Electrodes 51, 52 may be positioned in the chamber 27 with conductors 53, 54 leading from the electrodes to the exterior of the cell. The function of these electrodes will be described hereinbelow.

Figure 5:
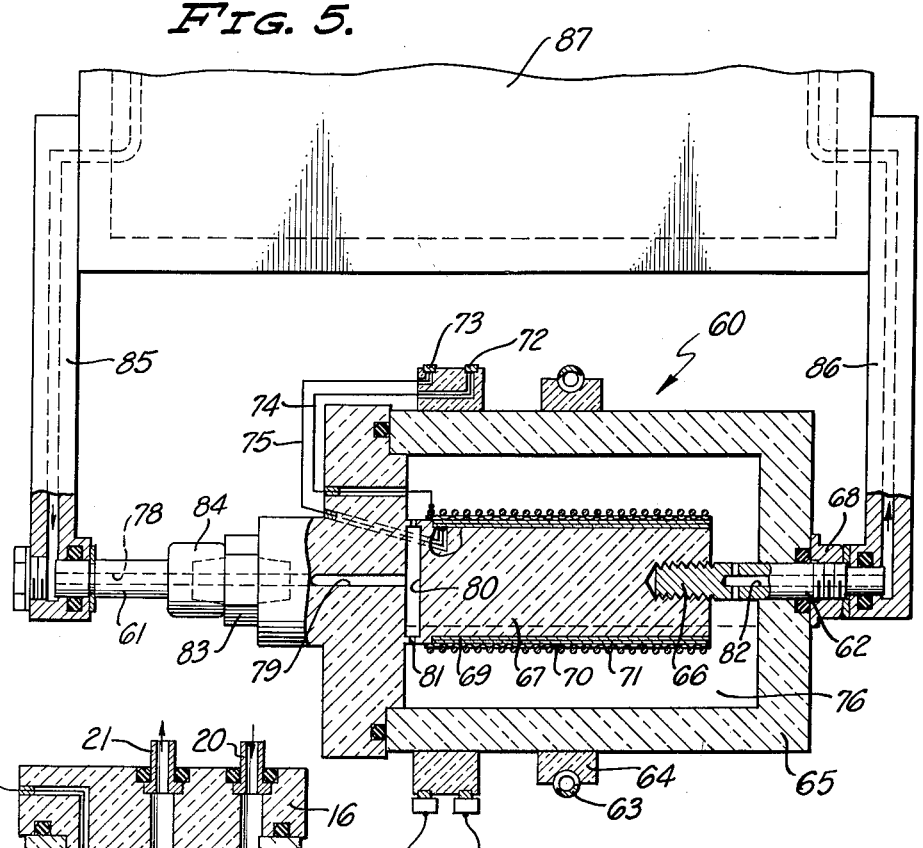
FIG. 5 is a vertical sectional view of another alternative embodiment of the invention.

Another embodiment of the galvanic cell of the invention is shown in FIG. 5, wherein the cell form is disposed horizontally and is rotated relative to the electrolyte to provide continuous circulation of the electrolyte over the cathode producing the desired film thereon.

In the embodiment of FIG. 5, a cell 60 is mounted in a horizontal position on shafts 61, 62 for rotation by a spring cable 63 engaging a pulley 64 carried on the cell container 65. An end 66 of the shaft 62 is threaded into a cell form 67 and a nut 68 on the other end of the shaft 62 serves to clamp the container and cell form together. An anode 69, a porous separator 70 and a cathode 71 are carried on the cell form 67 as in the cells of the previous embodiments. The anode and the cathode are connected to slip rings 72, 73 carried on the container by conductors 74, 75, respectively, providing for electrical connections to the externally positioned current-measuring device. A pool 76 of electrolyte is carried within the container 65 so that portions of the electrodes dip into the pool. Then as the cell is rotated, a film of electrolyte is carried upward by the cathode leaving the pool to maintain the film of electrolyte on the cathode. Alternatively, the container may be fixed and merely the cell form rotated. As another alternative, the cell form either by itself or with the container may be oscillated, thus dispensing with the necessity for slip rings.

Both rotating and oscillating cells have been successfully operated. The apparatus should provide a continuous wetting action with a minimum of splashing, since abrupt variations in film thickness produce rapid changes in indicated output. It should be noted that any apparatus which provides a substantially continuous flow of electrolyte over the cathode would be suitable for use in practicing the invention.

The gas sample stream is conducted into the cell through a passage 78 in the shaft 61, a passage 79 in the cell form, a manifold 80 in the cell form and openings 81, providing for flow of the gas sample over the cathode. The gas sample stream then flows out through a passage 82 in the shaft 62. The shaft 61 is coupled to the cell form by a fitting 83 and a nut 84.

The particular type of cell mounting is not critical to the invention and various structures for suspending the cell for rotation and for directing the gas sample stream therethrough will occur to one skilled in this field. In the preferred form shown herein, the shafts 61, 62 are rotatably suspended in arms 85, 86, respectively, which arms are dependent from a reservoir or housing 87. Each of the arms has a passage therethrough providing communication between a conduit in the housing and the passage of the corresponding shaft.

The rate of rotation of the cell is not critical and cells of this type have been operated successfully at rates in the range of 1 to 150 revolutions per minute. However, best results are obtained by having the cell form perfectly symmetrical and rotating it at a fixed rate so that the area of exposed cathode and the thickness of the film will be constant.

Another alternative form of the cell of FIGS. 1 and 3 is shown in FIG. 6, wherein like elements are identified by the same reference numerals. In this embodiment, an anode 90 is rested in the bottom of the container 15 and is connected into the external circuit by a conductor 91 passing through a packing nut 92 and seal 93 in the wall of the container. The separator 37 is applied directly to the cell form and the cathode wire is wound thereover as in the previous embodiments. In the structure of FIG. 6, the anode may be replaced by merely removing the container, without requiring replacement of the entire cell. Also, a large block of anode material may be used, materially increasing the replacement intervals.

The galvanic cell of the invention has a lower sensitivity than cells having no electrolyte film covering the cathode. However, the stability and linear range of the cell are vastly improved. One reason for this improvement appears to lie in the fact that the moving film of electrolyte on the cathode provides for a dispersal of the reaction products generated at the cathode.

The cell of the invention provides an improvement in linearity range in the order of 10 to 100 over that of previously known cells. With the cell of FIG. 1 constructed for oxygen analysis and operated with a circulating electrolyte, the output is linear from 0 to beyond 1100 parts per million of oxygen in the gas sample. Operation of the same cell with no circulation of the electrolyte results in a 7% deviation from linearity at 300 parts per million of oxygen, 20% deviation at 600 parts per million and 34% deviation at 900 parts per million. The cell of FIG. 5 has been operated for oxygen analysis and provides a linear output over the range of 0 to 21% oxygen, i.e., to the air point.

Changes in sensitivity from day to day are less than ±5% and often less than 1% for the cell operated in accordance with this invention. For a comparable cell operated without circulation of the electrolyte, the variation in sensitivity may be as great as ±30%, and is frequently greater than ±5%. This is especially true for the nonlinear region of operation, where the divergence from linearity is highly unstable.

The galvanic cell of the present invention also eliminates "cell hysteresis"; that is, the output of a cell with some dry cathode area is dependent upon its recent past history, especially if operated in the range of nonlinearity. For example, if the cell has been exposed to 10 parts per million oxygen for about an hour, and then the oxygen concentration changes to 1000 parts per million suddenly, the output will initially be near that predicted for linear response and then slowly drop off by 20 to 30% in the next hour. Thus for rapid large changes in oxygen concentration, the analyzer accuracy will be subject to ±20 to 30% error. The present invention reduces such hysteresis effects to a negligible value.

During the operation of the galvanic cell, the concentration of reaction products increases and oxides of the anode metal precipitate. These solid particles tend to accumulate in the porous insulator and after the rate of flow of electrolyte, resulting in a change in cell sensitivity. The cell of the invention includes means for removing the metallic ions from solution to prevent the precipitation and subsequent accumulation. The electrodes 51, 52 of the cell of FIG. 3 provide one method of removing the metallic ions from the electrolyte. The electrodes are connected to an external voltage source and, when energized, metallic ions are plated onto the negative electrode and oxygen may be liberated at the positive electrode, thus eliminating the undesirable metallic ions. The oxygen bubbles rise to the surface of the electrolyte and are carried out of the cell with the outgoing gas sample stream.

In an alternative method for removing metallic ions, a metal that is more active than the anode metal, i.e., more electropositive, may be positioned in the electrolyte pool, preferably in a quiescent portion. For example, where the anode is of lead, zinc may be used and the zinc will replace the lead ions in solution and lead will plate out on the zinc. As the zinc ions have no tendency to form insoluble compounds in the electrolyte, there is no tendency to clog the porous insulator.

One difficulty encountered in the methods of either of the two preceding paragraphs is that the anode metals do not plate out in a smooth hard surface. Particles of the metal may break loose and eventually plug the riser or other passages in the cell or may bridge across the anode and cathode. Another method which avoids this possibility is the use of a metal amalgam positioned in the electrolyte pool. The reaction is the same as in the preceding paragraph, i.e., using a zinc amalgam, the zinc will replace the lead ions in the electrolyte and the metallic lead will be mixed with the zinc amalgam and no loose particles will be created.

As a specific example of the invention, a galvanic cell was constructed as shown in FIG. 1 in which the cell form, riser tube and container were made of Lucite. The end 26 of the cell form was 1¼ inches in diameter and 2¼ inches long. The lead anode was made from 0.008 inch lead sheet, and the cathode was 64 turns of 28 gauge fine silver wire. The porous separator was 2 layers of laboratory filter paper. There were fifteen holes 30 equally spaced and formed by a 1/16" drill. The current sensitivity was 0.3 microampere per part per million oxygen, operating with 27.5% by weight KOH electrolyte.

It should be noted that the galvanic cell of the invention is not limited to aqueous electrolytic media. For example, it has been found that formamide or dimethyl formamide may be used instead of water as a solvent for the electrolyte. The non-aqueous electrolyte offers advantages where the sample to be analyzed is not compatible with an aqueous system, such as in the analysis of oxygen in boron hydride and boron chloride, also for the analysis of chlorine trifluoride and similar compounds.

As indicated previously the invention is not limited limited to oxygen analysis nor to the particular electrode and electrolyte materials specified above. Examples of other analyses, in addition to those of the aforementioned patents and copending applications are: chlorine analysis with platinum cathode, silver anode and KCl electrolyte; bromine analysis with platinum cathode, silver anode and KBr electrolyte; hydrazine analysis with platinum anode as the first electrode not reactable with the electrolyte, silver cathode as the second electrode and silver nitrate electrolyte; sulfur dioxide analysis (cathode reaction) with platinum cathode, lead anode and KCl electrolyte; sulfur dioxide analysis (anodic reaction) with platinum anode as the first electrode, gold cathode and gold chloride plus potassium chloride electrolyte; and nitrogen dioxide analysis with silver cathode, lead anode and an acid electrolyte, such as nitric acid.

Although several exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a galvanic cell for analysis of a stream of gas mixture for a specific gas therein, the combination of: first and second electrodes; a container having a pool of electrolyte therein, said container including means for supporting said electrodes therein with at least a portion of said first electrode out of said pool; means for passing a stream of gas sample through said container with said stream passing over said portion of said first electrode; means for circulating said electrolyte over substantially the entire exposed surface of said portion of said first electrode to maintain a moving film of electrolyte thereon preventing direct contact of the gas sample with said electrode while permitting diffusion of gas through said film to the surface of said portion; means for providing an electrolyte bridge between said electrodes, with said first electrode not being reactable with said electrolyte at any time and with said second electrode being reactable only when a specific gas is present at said first electrode; and a pair of conductors for connecting a current-measuring device across said electrodes for measuring the magnitude of current conduction therebetween when said specific gas is present in said sample.

2. In a galvanic cell for analysis of a stream of gas mixture for a specific gas therein, the combination of: first and second electrodes; a container having a pool of electrolyte therein, said container including means for supporting said electrodes therein with at least a portion of said first electrode out of said pool; means for passing a stream of gas sample through said container with said stream passing over said portion of said first electrode; means for circulating said electrolyte over substantially the entire exposed surface of said portion of said first electrode to maintain a moving film of electrolyte thereon preventing direct contact of the gas sample with said electrode while permitting diffusion of gas through said film to the surface of said portion; means for providing an electrolyte bridge between said electrodes, with said first electrode not being reactable with said electrolyte at any time and with said second electrode being reactable only when a specific gas is present at said first electrode; a pair of conductors for connecting a current-measuring device across said electrodes for measuring the magnitude of current conduction therebetween when said specific gas is present in said sample; and a piece of metal positioned in said electrolyte, said metal having a more positive oxidation potential and a greater solubility in said electrolyte than said second electrode.

3. In a galvanic cell for analysis of a stream of gas mixture for a specific gas therein, the combination of: first and second electrodes; a container having a pool of electrolyte therein, said container including means for supporting said electrodes therein with at least a portion of said first electrode out of said pool; means for passing a stream of gas sample through said container with said stream passing over said portion of said first electrode; means for circulating said electrolyte over substantially the entire exposed surface of said portion of said first electrode to maintain a moving film of electrolyte thereon preventing direct contact of the gas sample with said electrode while permitting diffusion of gas through said film to the surface of said portion; means for providing an electrolyte bridge between said electrodes, with said first electrode not being reactable with said electrolyte at any time and with said second electrode being reactable only when a specific gas is present at said first electrode; a pair of conductors for connecting a current-measuring device across said electrodes for measuring the magnitude of current conduction therebetween when said specific gas is present in said sample; and an amalgam of mercury and another metal positioned in said electrolyte, said other metal having a more positive oxidation potential and a greater solubility in said electrolyte than said second electrode.

4. A galvanic cell as defined in claim 1 for determining the oxygen content of a gas mixture in which said first electrode is a cathode and said second electrode is an anode, with the electrodes being of different metals and the anode having a more positive oxidation potential than the cathode.

5. A galvanic cell as defined in claim 1 for determining the chlorine gas content of a gas mixture in which said first electrode is a cathode, said second electrode is an anode, and said electrolyte is a chloride salt solution, with the electrodes being of different metals and the anode having a more positive oxidation potential than the cathode.

6. In a galvanic cell, the combination of: first and second electrodes; a container having a pool of electrolyte therein, said container including means for supporting said electrodes therein, said means including a cell form carrying said first electrode thereon above said pool and having a cavity with additional electrolyte therein and having at least one passage providing communication between said cavity and the upper portion of said first electrode; means defining another passage leading upward from said container adjacent said pool to said cavity; means for passing a stream of gas sample through said container with said stream passing over said first electrode and through said other passage with the flowing stream pumping electrolyte from said pool into said cavity for flow outward through said one passage and over said first electrode in a thin film; means for providing an electrolyte bridge between said electrodes, with said first electrode not being reactable with said electrolyte at any time and said second electrode being reactable only when a specific gas is present at said first electrode; and a pair of conductors for connecting a current-measuring device across said electrodes for measuring the magnitude of current conduction therebetween when said specific gas is present in said sample.

7. In a galvanic cell, the combination of: a container having a pool of electrolyte therein; a cell form carrying first and second electrodes separated by a separator which is porous to said electrolyte, said cell form having a cavity with additional electrolyte therein and having at least one passage providing communication between said cavity and the upper portion of said first electrode; means for mounting said cell form in said container above said pool; means defining another passage leading upward from said container adjacent said pool to said cavity; means for passing a stream of gas sample through said container with said stream passing over said first electrode and through said other passage with the flowing stream pumping electrolyte from said pool into said cavity for flow outward through said one passage and over said first electrode in a thin film, with said first electrode not being reactable with said electrolyte at any time and said second electrode being reactable only when a specific gas is present at said first electrode; and a pair of conductors for connecting a current-measuring device across said electrodes for measuring the magnitude of current conduction therebetween when said specific gas is present in said sample.

8. In a galvanic cell, the combination of: a container having a pool of electrolyte therein; a cell form carrying first and second electrodes separated by a separator which is porous to said electrolyte and substantially nonporous to a gas sample, said cell form having a cavity with additional electrolyte therein and having at least one passage providing communication between said cavity and the upper portion of said first electrode, with said separator covering the electrode end of said one passage; means for mounting said cell form in said container above said pool; means defining another passage leading upward from said container adjacent said pool to said cavity; means for passing a stream of gas sample through said container with said stream passing downward over said first electrode and upward through said other passage with the flowing stream pumping electrolyte from said pool up into said cavity for flow outward through said one passage and said separator and downward over said first electrode in a thin film, with said first electrode not being reactable with said electrolyte at any time and said second electrode being reactable only when a specific gas is present at said first electrode; and a pair of conductors for connecting a current-measuring device across said electrodes for measuring the magnitude of current conduction therebetween when said specific gas is present in said sample.

9. In a galvanic cell, the combination of: a container having a pool of electrolyte therein; a cell form carrying first and second electrodes separated by a separator which is porous to said electrolyte, said cell form having a cavity with additional electrolyte therein and having at least one passage providing communication between said cavity and the upper portion of said first electrode; a sleeve positioned within said cell form covering said one passage, said sleeve being porous to said electrolyte and substantially nonporous to a gas sample; means for mounting said cell form in said container above said pool; means defining another passage leading upward from said container adjacent said pool to said cavity; means for passing a stream of gas sample through said container with said stream passing downward over said first electrode and upward through said other passage with the flowing stream pumping electrolyte from said pool up into said cavity for flow outward through said sleeve and one passage and downward over said first electrode in a thin film, with said first electrode not being reactable with said electrolyte at any time and said second electrode being reactable only when a specific gas is present at said first electrode; and a pair of conductors for connecting a current-measuring device across said electrodes for measuring the magnitude of current conduction therebetween when said specific gas is present in said sample.

10. In a galvanic cell, the combination of: a container having a pool of electrolyte therein; a cell form carrying first and second electrodes separated by a liquid-absorbent separator which is porous to said electrolyte, said cell form having a cavity with additional electrolyte therein and having at least one passage providing communication between said cavity and the upper portion of said first electrode; means for mounting said cell form in said container above said pool with the lower end of said separator projecting into said pool; means defining another passage leading upward from said container adjacent said pool to said cavity; means for passing a stream of gas sample through said container with said stream passing downward over said first electrode and upward through said other passage with the flowing stream pumping electrolyte from said pool up into said cavity for flow outward through said one passage and down over said first electrode in a thin film, with said first electrode not being reactable with said electrolyte at any time and said second electrode being reactable only when a specific gas is present at said first electrode; and a pair of conductors for connecting a current-measuring device across said electrodes for measuring the magnitude of current conduction therebetween when said specific gas is present in said sample.

11. In a galvanic cell, the combination of: a container having a pool of electrolyte therein; a cell form carrying an inner layer of liquid-absorbent material which is porous to said electrolyte and an outer layer of a first electrode, said cell form having a cavity with additional electrolyte therein and having at least one passage providing communication between said cavity and the upper portion of said first electrode; a second electrode supported in said container in contact with said pool; means for mounting said cell form in said container above said pool with the lower end of said liquid-absorbent material projecting into said pool; means defining another passage leading upward from said container adjacent said pool to said cavity; means for passing a stream of gas sample through said container with said stream passing downward over said first electrode and upward through said other passage with the flowing stream pumping electrolyte from said pool up into said cavity for flow outward through said one passage and down over said first electrode in a thin film, with said first electrode not being reactable with said electrolyte at any time and said second electrode being reactable only when a specific gas is present at said first electrode; and a pair of conductors for connecting a current-measuring device across said electrodes for measuring the magnitude of current conduction therebetween when said specific gas is present in said sample.

12. In a galvanic cell, the combination of: a container having a pool of electrolyte therein; a cell form carrying first and second electrodes separated by a separator which is porous to said electrolyte, said cell form having a cavity with additional electrolyte therein and having at least one pasage providing communication between said cavity and the upper portion of the first electrode; means for mounting said cell form in said container above said pool; means defining another passage leading upward from said container adjacent said pool to said cavity; means for passing a stream of gas sample through said container with said stream passing downward over said first electrode and upward through said other passage with the flowing stream pumping electrolyte from said pool up into said cavity for flow outward through said one passage and downward over said first electrode in a thin film, with said first electrode not being reactable with said electrolyte at any time and said second electrode being reactable only when a specific gas is present at said first electrode; a pair of conductors for connecting a current-measuring device across said electrodes for measuring the magnitude of current conduction therebetween; an additional pair of electrodes positioned in said electrolyte in said cavity when said specific gas is present in said sample; and an additional pair of conductors for connecting said pair of electrodes to a voltage source for plating metallic ions from said electroltye onto the negative of said pair of electrodes.

13. In a galvanic cell, the combination of: a container having a pool of electrolyte therein; a cell form having an axis and having first and second electrodes positioned about said axis with said first electrode separated from said second electrode by a separator which is porous to said electrolyte; means for mounting said cell form in said container with said axis substantially horizontal and with at least a portion of said first electrode out of said pool; means for passing a stream of gas sample through said container with said stream passing over said portion of said first electrode, with said first electrode not being reactable with said electrolyte at any time and said second electrode being reactable only when a specific gas is present at said first electrode; means for circulating said electrolyte over substantially the entire exposed surface of said first electrode to maintain a moving film of electrolyte on said first electrode preventing direct contact of the gas sample with the electrode; and a pair of conductors for connecting a current-measuring device across said electrodes for measuring the magnitude of current conduction therebetween when said specific gas is present in said sample.

14. In a galvanic cell, the combination of: a container having a pool of electrolyte therein; an elongate cell form carrying first and second electrodes separated by a separator which is porous to said electrolyte, with at least a portion of said first electrode out of said pool; means for mounting said cell form in said container with the longitudinal axis of said cell form substantially horizontal; means for passing a stream of gas sample through said container with said stream passing over said portion of said first electrode, with said first electrode not being reactable with said electrolyte at any time and said second electrode being reactable only when a specific gas is present at said first electrode; means for rotating said cell form relative to said pool of electrolyte about said axis to provide a moving film of electrolyte on substantially the entire exposed surface of said first electrode; and a pair of conductors for connecting a current-measuring device across said electrodes for measuring the magnitude of current conduction therebetween when said specific gas is present in said sample.

15. In a galvanic cell, the combination of: a container having a pool of electrolyte therein; a cylindrical cell form having a first electrode, a separator and a second electrode carried thereon in layers with the first electrode outermost and the separator porous to said electrolyte; means for mounting said cell form in said container with its axis substantially horizontal and with a portion of said first electrode above the surface of said pool; means for passing a stream of gas sample through said container with the stream passing over said portion of said first electrode, with said first electrode not being reactable with said electrolyte at any time and said second electrode being reactable only when a specific gas is present at said first electrode; means for moving said cell form relative to said pool to provide a moving film of electrolyte over substantially the entire exposed surface of said first electrode; and a pair of conductors for connecting a current-measuring device across said electrodes for measuring the magnitude of current conduction therebetween when said specific gas is present in said sample.

16. A process for analyzing a gas sample stream for its content of a specific gas, the process including the steps of: flowing the gas sample past a first electrode of a galvanic cell which is coupled to a second electrode of the cell by an electrolyte carrier, the first electrode not being reactable with the electrolyte at any time, the second electrode being reactable with the electrolyte when the specific gas is present at the first electrode and not being reactable with the electrolyte in the absence of the specific gas; circulating such electrolyte to maintain a flowing film of electrolyte on the first electrode to cover substantially the entire exposed surface of the first electrode and prevent direct contact of the gas sample therewith while permitting diffusion of gas through the film to the first electrode; and determining the magnitude of the electric current conduction between the electrodes as a measure of the specific gas content of the sample gas stream.

17. A process for analyzing a gas sample for its content of a specific gas, the process including the steps of: flowing the gas sample past a first electrode of a galvanic cell which is coupled to a second electrode of the cell by an electrolyte carrier, the first electrode not being reactable with the electrolyte at any time, the second electrode being reactable with the electrolyte when the specific gas is present at the first electrode and not being reactable with the electrolyte in the absence of the specific gas; circulating such electrolyte from a pool over the first electrode and back to the pool to provide a moving film of electrolyte on substantially the entire exposed surface of the first electrode preventing direct contact of the gas sample therewith while permitting diffusion of gas through the film to the first electrode; and determining the magnitude of the electric current conduction between the electrodes as a measure of the specific gas content of the sample gas stream.

References Cited in the file of this patent

UNITED STATES PATENTS

| | | |
|---|---|---|
| 2,156,693 | Jacobson | May 2, 1939 |
| 2,401,287 | Yant | May 28, 1946 |
| 2,651,612 | Haller | Sept. 8, 1953 |
| 2,805,191 | Hersch | Sept. 3, 1957 |
| 2,943,028 | Thayer et al. | June 28, 1960 |
| 2,943,036 | Thayer et al. | June 28, 1960 |
| 2,992,170 | Robinson | July 11, 1961 |